United States Patent Office 3,402,181
Patented Sept. 17, 1968

3,402,181
LOWER ALKYLENE KETALS OF CYCLOPENTANEDIONE
Julius L. E. Erickson, Baton Rouge, and Frank E. Collins, Jr., Jonesville, La., and Robert T. Dahill, Jr., Perth Amboy, N.J., assignors to The Givaudan Corporation, New York, N.Y., a corporation of New Jersey
No Drawing. Filed Mar. 31, 1965, Ser. No. 444,448
3 Claims. (Cl. 260—340.7)

ABSTRACT OF THE DISCLOSURE

A process for preparing 2-cyclopenten-1-ones and novel intermediates is disclosed.

The process is represented as follows:

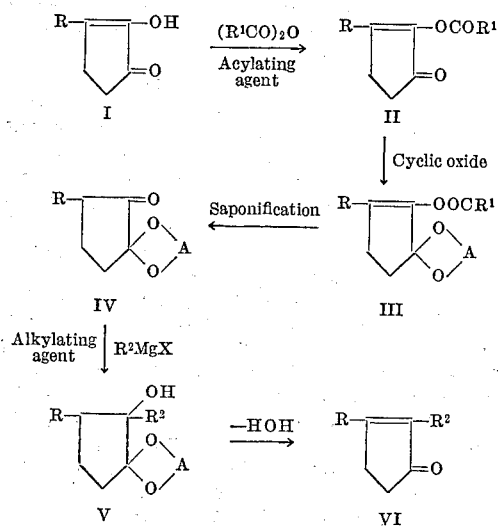

wherein R=H or alkyl such as methyl, $R^1$ and $R^2$ are selected from the group consisting of aryl, alkyl, aralkyl and cycloaliphatic radicals, and A is an alkylene chain having at least two carbon atoms, which may have one or more of the hydrogen atoms substituted e.g. with alkyl radicals, and X is a member selected from the group consisting of chlorine, bromine and iodine. R, $R^1$, and $R^2$ may be the same or different. The radicals in R, $R^1$ and $R^2$ may be saturated or unsaturated.

The novel intermediates (IV) are useful in perfumery, and as flavors, as well as intermediates for pharmaceuticals.

Several detailed examples are given.

The present invention relates to the preparation of certain ketones, i.e., the 2-cyclopenten-1-ones, and to the provision of novel intermediates therefor.

The ketones referred to herein have value in perfumery. Among such ketones are the highly prized jasmone and dihydrojasmone.

While synthetic methods are known for the preparation of such ketones, e.g., dihydrojasmone, such methods require starting materials often difficult to obtain in quantity, in good yield, and in a high state of purity. Also, known methods often require special refining methods for the obtention of the ketones in pure form; and the yields of the latter are very low.

It has now been found that ketones of the class above designated can be prepared in a technically simple and commercially feasible manner. In general, the process of this invention may be represented schematically in the following manner:

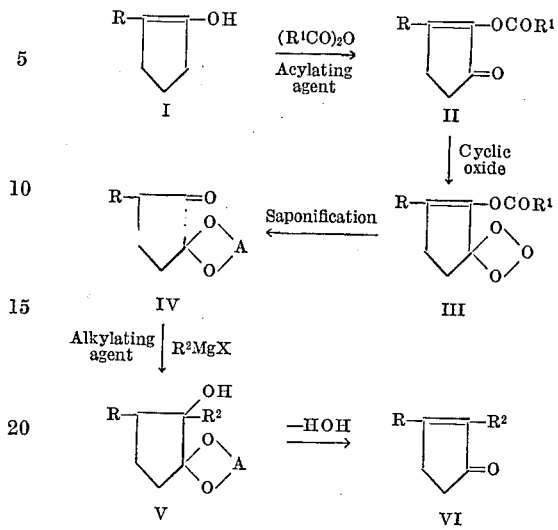

wherein R=H or alkyl such as methyl, $R^1$ and $R^2$ are selected from the group consisting of aryl, alkyl, aralkyl and cycloaliphatic radicals, and A is an alkylene chain having at least two carbon atoms, which may have one or more of the hydrogen atoms substituted e.g., with alkyl radicals, and X is a member selected from the group consisting of chlorine, bromine and iodine. R, $R^1$ and $R^2$ may be the same or different. The radicals in R, $R^1$ and $R^2$ may be saturated or unsaturated.

In carrying out the sequence of reactions which comprise the process of this invention, either or both of the compounds designated as III and V need not be isolated, if desired.

In carrying out the process of this invention the various steps are conducted as follows:

I is converted to II by the action of a suitable esterifying agent, e.g. acid anhydride, at elevated temperature, i.e., under heating, followed by distillation.

II is converted to III by formation of a ketal with a cyclic oxide in the presence of suitable solvents and catalysts, such as stannic chloride and Friedel-Craft catalysts.

III is converted to IV by saponification.

IV is converted to V by conducting an alkylation reaction, such as a Grignard reaction in the usual manner, in the presence of a suitable solvent, such as diethyl ether, dibutyl ether or benzene, and at elevated temperatures.

V was finally converted into VI by suitable dehydration procedure, e.g., in the presence of sulfuric acid, or other dehydrating acids or acid salts useful for dehydrating tertiary alcohols.

As illustrative of the reactants, reagents and solvents which may be used in accordance with this invention, the following also are mentioned:

The starting materials (I) may be those wherein R in the foregoing formula is hydrogen or alkyl such as methyl. Present scientific evidence points to the correctness of enol formula set forth above. Where R is $CH_3$, the material I is a readily available substance of natural occurrence which was first isolated by the dry distillation of beech wood and later was found in the acid oil fraction of pyroligneous acid, in tall oil, and in a number of soluble wood tars. It was also obtained by the alkaline hydrolysis of spruce wood. Reported syntheses of this compound include dehydrogenation of divinyl glycol over copper at 280°; hydrolysis of the 5,5-dichloro derivative of 2-methylcyclopentanone, and methylation of the condensation product of ethyl oxalate and ethyl glutarate, followed by decarboxylation.

Any suitable esterifying agent such as anhydrides, $(R^1CO)_2O$, may be used. Examples of such anhydrides are acetic anhydride, propionic anhydride and butyric anhydride. Other esterifying agents include acid chlorides, or enol esters, such as acetyl chloride, propionyl chloride and isopropenyl acetate.

Among the cyclic oxides which may be used to form the ketal (III) from II are the following: ethylene oxide, propylene oxide, butylene oxide and styrene oxide.

As regards alkylating agents, Grignard reagents, $R^2M_gX$, are preferred. They include akyl Grignards, such as methyl magnesium chloride, isopropyl magnesium chloride, n-butyl magnesium chloride, tertiary-butyl magnesium chloride, n-pentyl magnesium chloride and dodecyl magnesium chloride; aryl Grignards such as phenyl magnesium chloride, methyl phenyl magnesium chloride, ethyl phenyl magnesium chloride, isopropyl phenyl magnesium chloride and dimethyl phenyl magnesium chloride; aralkyl Grignards such as benzyl magnesium chloride, methyl benzyl magnesium chloride, ethyl benzyl magnesium chloride, ispropyl benzyl magnesium chloride, t-butyl benzyl magnesium chloride and dimethyl benzyl magnesium chloride; and cycloalkyl Grignards, such as cyclohexyl magnesium chloride, methyl cyclohexyl magnesium chloride, ethyl cyclohexyl magnesium chloride, isopropyl cyclohexyl magnesium chloride, t-butyl cyclohexyl magnesium chloride, dimethyl cyclohexyl magnesium chloride, methyl isopropyl cyclohexyl magnesium chloride, and alkyl magnesium chloride.

In place of the aforementioned chlorides, the corresponding bromides and iodides can be used.

It is understood that the corresponding Reformatsky and alkyl metal alkylating agents may be used in place of the Grignard reagents. Consequently, it is intended that wherever the context so admits or requires in the specification, and claims, the recitation of a Grignard reagent includes the corresponding Reformatsky reagent.

The compounds designated as IV herein are all novel and possess unique properties making them useful, per se or as intermediates, in perfumery and for flavor use and of potential value as intermediates for substances having pharmaceutical value and for other purposes, e.g., for reactions in which it is desired to protect the carbonyl group in the 1 position but in which it is desired to react the CO group in the 2-position, e.g., with basic reagents.

In order to illustrate this invention further, but without limiting the same, the following examples are given. Teperatures are given in degree centigrade. Melting points are corrected; boiling points are uncorrected, spectra were recorded on a Perkin Elmer Model 21 infrared spectrophotometer, and a Cary Model 14 ultraviolet spectrophotometer. Gas phase chromatographic analyses were performed on a Barber Coleman Model 20 gas chromatograph using a 100 ft. GE capillary column.

EXAMPLE 1

3-methylcyclopent-2-en-2-ol-1-one

This substance was obtained as a hydrate, M.P. 77–81°. Purification was accomplished by refluxing the crude material dissolved in benzene in a flask fitted with a Dean Stark trap until the water was removed. The benzene solution was concentrated by distillation until only a small quantity of solvent remained, and the residue was recrystallized from isopropyl alcohol to give a white solid, M.P. 105.5–106.5°; lit. M.P. 105–106°, M.P. 106–107° (sublimed). Ultraviolet spectrum:

$$\lambda_{max.}^{EtOH}\ 258\ m\mu\ (\epsilon 710)$$

infrared spectrum:

$\lambda_{max.}^{CC}$ 2.83, 2.97, 3.42, 5.80, 5.97, 6.93, 7.08, 7.14, 7.34, 7.77, 8.14, 8.33, 9.00, 9.77$\mu$

*Analysis.*—Calcd. for $C_6H_8O_2$: C, 64.27; H, 7.19 Found: C, 64.25; H, 7.31.

EXAMPLE 2

2-acetoxy-3-methylcyclopent-2-en-1-one

A mixture of 336 g. (3 moles) of 3-methylcyclopent-2-en-ol-1-one (I) and 918 g. (9 moles) of acetic anhydride was refluxed for 1 hr. The acetic acid and excess acetic anhydride were removed by distillation and the residue was fractionated to yield 435 g. (94%) of a liquid, B.P. 105–106° (3 mm.). Upon standing the product crystallized very slowly to yield a hard, white solid, M.P. 61.5–62.5°, which gave a negative ferric chloride test. Recrystallization from either benzene, methanol, or water gave crystals, M.P. 62–62.5°; lit. M.P. 65° (water), B.P. 129–130° (12 mm.). Infrared spectrum.

$\lambda_{max.}^{CCl}$ 3.41, 5.60, 5.77, 5.97, 6.93, 7.09 7.22, 7.30, 7.52, 8.38, 9.19, 9.61 and 11.43$\mu$

*Analysis.*—Calcd. for $C_8H_{20}O_3$: C, 62.32; H, 6.54. Found: C, 62.22, 62.20; H, 6.55, 6.60.

EXAMPLE 3

2-acetoxy-3-methylcyclopent-2-en-1-one-propylene ketal

To 34 g. (0.13 mole) of stannic chloride dissolved in 150 ml. of carbon tetrachloride was added dropwise (2 hr.) with stirring at 20° a mixture of 200 g. (1.3 moles) of 2-acetoxy-3-methylcyclopent-2-en-1-one (II), 93 g. (1.6 moles) of propylene oxide, and 475 ml. of carbon tetrachloride. The mixture was hydrolyzed by addition of 520 ml. of 10% sodium hydroxide solution. The organic layer was separated and washed with 150 ml. of water, and then dried over anhydrous potassium carbonate. The solvent was removed and the residue was distilled to give 5.2 g. of forerun, B.P. 66–102° (3 mm.), 146 g. (53%) of the product, B.P. 102–107° (3 mm.), and 38 g. of a tarry residue. Refractionation through a 10-inch, vacuum-jacketed, packed column gave 136 g. of III, B.P. 104–106.5° (3 mm.), $n^{25}D$ 1.4653, $d_4^{25}$ 1.1004, $MR_D$ 53.24 (calcd. 53.08), infrared spectrum: $\lambda_{max}$ 3.45, 5.65, 5.85, 6.90, 7.30, 7.54, 7.75, 8.20–8.80, 9.10–9.40, 9.60–9.75, 10.17, 10.77, 11.07, 11.38, 11.83, and 12.75–13.25$\mu$. The product was shown to be 98% pure by vapor phase chromatographic analysis. Acid hydrolysis of III gave I, M.P. 105–106°, M.M.P. 105–106°.

*Analysis.*—Calcd. for $C_{11}H_{16}O_4$: C, 62.25; H, 7.60; mol. wt. 212.2. Found: C, 61.93; H, 7.81; mol. wt. (benzene), 197, 201.

In similar manner, 2-acetoxy-3-methylcyclopent-2-en-1-one ethylene ketal, B.P. 105–106° (3 mm.) was obtained when 1.6 moles of ethylene oxide was substituted for the propylene oxide.

EXAMPLE 4

3-methyl-1,2-cyclopentanedione-1,1-propylene ketal

To 450 ml. of 10% sodium hydroxide solution at 25° was added 134 g. (0.63 mole) of 2-acetoxy-3-methylcyclopent-2-en-1-one propylene ketal (III) and the resulting suspension was stirred for 0.5 hr. The reaction mixture was extracted with three 75-ml. portions of ether and the combined ethereal extracts were washed with 50 ml. of water, and then dried over anhydrous potassium carbonate. The ether was removed by evaporation, and the clear residual oil was distilled through a 10-inch, vacuum-jacketed, packed column to give 86 g. (80%) of IV, B.P. 65.5–66° (3 mm.), $n^{25}D$ 1.4485, $d_4^{25}$ 1.0683, $MR_D$ 42.63 (calcd. 42.66), infrared spectrum: $\lambda_{max}$ 3.40, 5.70, 6.85, 7.27, 7.45, 7.80, 8.37, 8.55 9.25, 9.30, 9.58, 9.87, 10.18, 19.60, 11.13, 11.75, 12.87, 13.14, and 13.98$\mu$. Vapor phase chromatographic analysis gave a single peak.

*Analysis.*—Calcd. for $C_9H_{14}O_3$: C, 63.51; H, 8.29. Found: C, 62.15; H, 8.35.

The product of this example has unique and desirable properties as an olfactory perfume agent and as a flavor material. It is potentially useful as a chemical intermediate for pharmaceuticals. It has been found to be useful in deodorant oils, classical perfume bouquets, and in maple, walnut, pecan, butterscotch, caramel and toffee type flavoring compositions.

EXAMPLE 5

2-n-amyl-3-methylcyclopentan-2-ol-1-one propylene ketal

To an ethereal solution of n-amylmagnesium chloride, prepared from 76 g. (0.72 mole) of n-amyl chloride and 15.6 g. (0.64 atom) of magnesium, was added over a period of 15 min. 68 g. (0.4 mole) of 3-methyl-1,2-cyclopentanedione-1,1-propylene ketal (IV). The mixture was stirred and refluxed for 15 min., and then poured into a mixture of 250 ml. of a saturated ammonium chloride solution containing 250 g. of crushed ice. The ethereal solution was separated and washed successively with 50 ml. of water, 50 ml. of 1% sodium hydroxide solution and again with 50 ml. of water, and then dried over anhydrous potassium carbonate. The ethereal solution was concentrated and the residue was fractionated through a 10-inch, vacuum-jacketed, packed column to yield 12 g. of forerun, B.P. 75–110° (2 mm.), and 70 g. (72%) of V, B.P. 110–111° (2 mm.), $n^{25}D$ 1.4590, $d_4^{25}$ 0.9961, $MR_D$ 66.52 (calcd. 67.27), infrared spectrum: $\lambda_{max}$ 2.80, 2.95, 3.90, 6.83, 7.27, 7.60, 7.70, 8.62, 9.15, 9.65, 10.27, 10.55, 10.72, and 11.42μ.

*Analysis.*—Calcd. for $C_{14}H_{26}O_3$: C, 69.38; H, 10.81. Found: C, 69.65; H, 10.50.

EXAMPLE 6

Dihydrojasmone (VI)

To 38 g. (0.157 mole) of 2-n-amyl-3-methylcyclopentan-2-ol-1-one propylene ketal (V) was added 100 ml. of 25% sulfuric acid solution and the resulting mixture was steamed distilled. The organic layer was separated and the water layer was saturated with sodium chloride before extraction with 200 ml. of ether. The combined organic layers were dried over anhydrous magnesium sulfate; ether was removed, and the residue was distilled to give 22 g. (84%) of dihydrojasmone, B.P. 87–88° (2 mm.), $n^{25}D$ 1.4771, $d_4^{25}$ 0.9157, $MR_D$ 51.31 (calcd. 50.34); lit. B.P. 101–102° (5 mm.), $n^{15}D$ 1.48107, $d^{15}$ 0.9201; lit. B.P. 117° (9 mm.), $n^{18}D$ 1.4810, $d_4^{18}$ 0.9165. Ultraviolet spectrum:

$$\lambda_{max.}^{EtOH}\ 236\ m\mu\ (\epsilon 12{,}000)$$

infrared spectrum: $\lambda_{max}$ 3.43, 5.85, 6.05, 6.93, 7.09, 7.23, 7.40, 7.48, 7.72, 7.90, 8.50, 9.33, 9.84, 10.05, 10.62, 10.80, 12.20, and 13.75μ.

*Anylsis.*—Calcd. for $C_{11}H_{18}O$: C, 79.46; H, 10.91. Found: C, 79.61; H, 11.38.

EXAMPLE 7

3-methyl-1,2-cyclopentanedione-1,1-propylene ketal (IV)

2-acetoxy-3-methylcyclopent-2-en-1-one (II) may be converted into IV directly, thus making unnecessary the isolation of III. To a stirred solution of 19.5 g. (0.075 mole) of stannic chloride dissolved in 150 ml. of carbon tetrachloride was added dropwise over a period of 1.5 hr. at 20° three-fourths of a mixture consisting of 154 g. (1 mole) of II, 72.5 g. (1.25 moles) of propylene oxide, and 450 ml. of carbon tetrachloride. An additional 6.5 g. (0.025 mole) of stannic chloride was introduced, and then the remaining portion of the above mixture was added dropwise under the same conditions. The reaction mixture was hydrolyzed by addition of 240 ml. of 10% sodium hydroxide solution. The organic layer was separated and washed with two 100 ml. portions of water, and then dried over anhydrous potassium carbonate. The carbon tetrachloride was removed by distillation under reduced pressure; the residue was stirred at 25° with 800 ml. of 10% sodium hydroxide solution for 0.5 hr., and the resulting suspension was extracted with five 100-ml. portions of ether. The combined ethereal extracts were washed with 100 ml. of water, and then dried over anhydrous potassium carbonate. The ether was removed, and the residue was fractionated through a 10-inch, vacuum-jacketed, packed column to yield 56 g. (33%) of IV, B.P. 66° (3 mm.), $n^{25}D$ 1.4481, and a tarry residue. The infrared spectrum of this product was identical with that of IV obtained by the hydrolysis of III.

EXAMPLE 8

3-methyl-2-n-amyl-2-cyclopenten-1-one (VI)

3 - methyl - 1,2 - cyclopentanedione-1,1-propylene ketal (IV) may be converted into VI directly, thus avoiding the isolation of V, and with profit in yield. To an ethereal solution of n-amyl magnesium chloride, prepared from 69 g. (0.65 mole) of n-amyl chloride and 13.6 g. (0.56 atom) of magnesium, was added over a period of 15 min. 61 g. (0.36 mole) of IV. The mixture was stirred and refluxed for 15 min., and then poured into a mixture of 150 ml. of concentrated hydrochloric acid and crushed ice. The ethereal solution was separated, and washed successively with 75 ml. of water, 75 ml. of 1% sodium hydroxide solution, and again with 75 ml. of water, and then dried over anhydrous magnesium sulfate. The ether was removed by evaporation; the residue was refluxed and stirred for 2 hr. with 120 g. of 25% sulfuric acid solution, and then steam distilled. The organic layer was separated, and the water layer was saturated with sodium chloride prior to extraction with 200 ml. of ether. The combined organic layers were dried over anhydrous magnesium sulfate. The ether was removed, and the residual oil was distilled to give 1 g. of forerun, B.P. 83–85° (2 mm.), 39 g. (65%) of VI, B.P. 85–89° (2 mm.), and 2.4 g. of residue. Refraction of the odorous material through a 10-inch, vacuum-jacketed, packed column gave 35.5 g. of VI, B.P. 86.5–88° (2 mm.), $n^{25}D$ 1.4771. The infrared spectrum of this liquid was identical with that of VI obtained by the dehydration of V.

EXAMPLE 9

2-n-butyl-3-methyl-2-cyclopenten-1-one (VI)

3 - methyl - 1,2-cyclopentane-dione-1,1-propylene ketal (68 g.), prepared as in Example 4, was treated as in Example 8, using the Grignard reagent (98.5 g.) prepared from n-butyl bromide in place of the n-amylmagnesium chloride used in Example 8.

There was thus obtained 2-n-butyl-3-methyl-2-cyclopenten-1-one (44 g., 36 wt. percentage), B.P. 83–85° (0.5 mm.), $n_D^{20}$=1.4791.

EXAMPLE 10

2-cyclohexyl-3-methyl-2-cyclopenten-1-one (VI)

3 - methyl - 1,2-cyclopentane-dione-1,1-propylene ketal (68 g.), prepared as in Example 4, was treated as in Example 8, using the Grignard reagent (117 g.) prepared from cyclohexyl bromide in place of the n-amylmagnesium chloride used in Example 8.

There was thus obtained 2-cyclohexyl-3-methyl-2-cyclopenten-1-one (39.5 g., 41 wt. percent); B.P. 97–99° (0.5 mm.) $n_D^{20}$=1.5130.

*Analysis.*—Calcd. for $C_{12}H_{18}O$: C, 80.85; H, 10.18. Found: C, 80.59; H, 10.32.

While the invention has been described in detail as to method and products, it is understood that changes may be made pertaining to both, and hence no limitations on the invention are intended other than those imposed by the scope of the appended claims, construed as broadly as permissible in view of the prior art.

What is claimed is:
1. A compound having the structural formula:

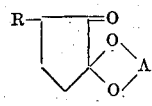

where R is a member selected from the group consisting of H and lower alkyl and A is alkylene having 2 to 4 carbon atoms in the chain.

2. 3 - lower alkyl-1,2-cyclopentane-dione-1,1-propylene ketal.
3. 3-methyl-1,2-cyclopentanedione-1,1-propylene ketal.

References Cited
UNITED STATES PATENTS
2,606,909  8/1952  Blecke _____ 260—340.9
2,993,056  7/1961  Segre et al. _____ 260—340.9 X NICHOLAS S. RIZZO, *Primary Examiner.*
J. H. TURNIPSEED, *Assistant Examiner.*

UNITED STATES PATENT OFFICE
CERTIFICATE OF CORRECTION

Patent No. 3,402,181                                          September 17, 1968

Julius L. E. Erickson et al.

It is certified that error appears in the above identified patent and that said Letters Patent are hereby corrected as shown below:

Column 1, lines 25 to 30, that portion of formula III reading "-OOCR$^1$" should read -- -OCOR$^1$ --. Column 2, lines 3 to to 7, formula I should appear as shown below:

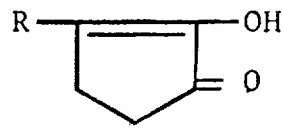

same column 2, lines 10 to 14, formulas III and IV should appear as shown below:

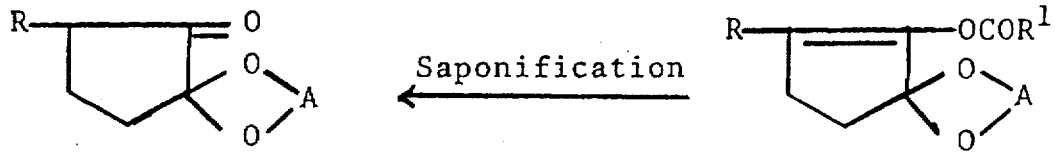

Column 3, line 11, "akyl" should read -- alkyl --; line 21, "ispropyl" should read -- isopropyl --; line 48, "Teperatures" should read -- Temperatures --; same line 48, "degree" should read -- degrees --; line 74, $\lambda^{CC}_{max.}$        should read        $\lambda^{CCl}_{max.}$ Column 4, line 8, "2-en-ol-1-one" should read -- 2-en-2-ol-1-one --; line 73, "19.60" should read -- 10.60 --.

Signed and sealed this 3rd day of March 1970.

(SEAL)
Attest:

EDWARD M. FLETCHER, JR.                      WILLIAM E. SCHUYLER, JR.
Attesting Officer                                   Commissioner of Patents